United States Patent
Letas

(10) Patent No.: US 10,637,248 B2
(45) Date of Patent: Apr. 28, 2020

(54) SYSTEMS AND METHODS FOR WIND TURBINE CIRCUIT BREAKING

(71) Applicant: SENVION GmbH, Hamburg (DE)

(72) Inventor: Heinz-Hermann Letas, Bovenau (DE)

(73) Assignee: SENVION GmbH, Hamburg (DE)

( * ) Notice: Subject to any disclaimer, the term of this patent is extended or adjusted under 35 U.S.C. 154(b) by 0 days.

(21) Appl. No.: 15/928,405

(22) Filed: Mar. 22, 2018

(65) Prior Publication Data

US 2018/0287369 A1  Oct. 4, 2018

(30) Foreign Application Priority Data

Mar. 30, 2017  (DE) .................. 10 2017 003 078

(51) Int. Cl.
| | | |
|---|---|---|
| *H02J 3/38* | (2006.01) | |
| *F03D 80/80* | (2016.01) | |
| *F03D 9/25* | (2016.01) | |
| *H02P 9/10* | (2006.01) | |
| *H02P 101/15* | (2016.01) | |

(52) U.S. Cl.
CPC ............... *H02J 3/38* (2013.01); *F03D 9/255* (2017.02); *F03D 80/85* (2016.05); *H02J 3/386* (2013.01); *H02P 9/107* (2013.01); *F05B 2220/706* (2013.01); *H02P 2101/15* (2015.01); *Y02E 10/725* (2013.01); *Y02E 10/763* (2013.01)

(58) Field of Classification Search
CPC .... F03D 80/85; F03D 9/255; F05B 2220/706; H02H 7/06; H02J 3/386; H02P 2101/15; H02P 9/107; Y02E 10/725; Y02E 10/763
See application file for complete search history.

(56) References Cited

U.S. PATENT DOCUMENTS

| | | | |
|---|---|---|---|
| 5,886,888 A | 3/1999 | Akamatsu et al. | |
| 8,710,689 B2* | 4/2014 | Letas | H02J 3/1892 290/55 |
| 2003/0227172 A1* | 12/2003 | Erdman | F03D 7/0284 290/44 |

(Continued)

FOREIGN PATENT DOCUMENTS

| | | |
|---|---|---|
| DE | 196 16 591 | 12/1996 |
| DE | 10 2008 018 748 | 10/2009 |

(Continued)

OTHER PUBLICATIONS

Search Report dated Sep. 6, 2018, directed to EP Application No. 18163977; 6 pages.

(Continued)

*Primary Examiner* — Tulsidas C Patel
*Assistant Examiner* — S. Mikailoff
(74) *Attorney, Agent, or Firm* — Morrison & Foerster LLP

(57) ABSTRACT

A wind turbine includes a wind rotor, a generator, and a converter. The generated electric power is fed from the converter by means of a feed to a turbine transformer for delivery to a grid. The feed is designed as a double branch including a power-branched power circuit breaker unit having a first feed line and a second feed line connected in parallel, wherein a separate low-voltage winding of the turbine transformer and a separate power circuit breaker at the connector of the converter is associated with each feed line.

8 Claims, 3 Drawing Sheets

(56) References Cited

U.S. PATENT DOCUMENTS

| | | | |
|---|---|---|---|
| 2004/0100102 A1* | 5/2004 | Wobben | F03D 7/0272 290/55 |
| 2011/0031762 A1* | 2/2011 | Letas | H02J 3/1892 290/55 |
| 2013/0200714 A1* | 8/2013 | Pan | H02J 3/386 307/82 |
| 2014/0197639 A1 | 7/2014 | Bala et al. | |
| 2014/0246854 A1 | 9/2014 | Spooner et al. | |
| 2014/0292088 A1* | 10/2014 | Eichert | H02J 3/38 307/82 |
| 2017/0331295 A1* | 11/2017 | Abeyasekera | F03D 7/042 |
| 2018/0123470 A1* | 5/2018 | Nielsen | H02P 27/00 |
| 2018/0287369 A1* | 10/2018 | Letas | F03D 9/255 |
| 2018/0287386 A1* | 10/2018 | Oates | H02J 3/16 |
| 2018/0323619 A1* | 11/2018 | Ganireddy | H02M 5/4585 |

FOREIGN PATENT DOCUMENTS

| | | |
|---|---|---|
| EP | 2 477 301 | 7/2012 |
| WO | 02/15367 | 2/2002 |
| WO | 2014/194464 | 12/2014 |
| WO | 2016/066169 | 5/2016 |
| WO | 2016/146403 | 9/2016 |
| WO | WO-2017/129766 | 8/2017 |

OTHER PUBLICATIONS

Search Report dated Sep. 27, 2017 directed to DE Application No. 10 2017 003 078.2, 2 pages.

* cited by examiner

SYSTEMS AND METHODS FOR WIND TURBINE CIRCUIT BREAKING

CROSS-REFERENCE TO RELATED APPLICATIONS

This application claims the priority of German Application No. 10 2017 003 078.2, filed Mar. 30, 2017, the entire contents of which are incorporated herein by reference.

FIELD OF THE INVENTION

The present invention relates to a wind turbine comprising a wind rotor, a generator, and a converter, for generating electric power which is delivered to a grid via a turbine transformer.

BACKGROUND OF THE INVENTION

Modern wind turbines are capable of generating a considerable amount of electric power. They typically have power ratings of several megawatts. The electric power generated by the wind turbine is generally raised to a higher voltage level (usually a medium-voltage level) which is more suitable for transmission, via a transformer which is associated with the wind turbine (turbine transformer). For protecting the wind turbines and the grid, circuit breakers are required on both sides of the turbine transformer. In this case, it is problematic that the circuit breakers on the low-voltage side of the turbine transformer have quite high currents. In the case of the wind turbine power levels of several megawatts which are now being achieved, this sometimes makes expensive special designs necessary for the circuit breakers.

Various ways have been proposed to make it possible nonetheless to manage sufficiently large currents. A first way would be to increase the voltage level on the low-voltage side, in order thereby to lower the current load. However, this has proven to be impractical due to the upper limits for voltages which are defined in relevant standards; thus, they still fall into the low-voltage range. The limit values (1000 VAC) are already being strained. A second way could be simply to connect two circuit breakers in parallel. This internal proposal by the applicant may provide the advantage that during normal operation, each of the two circuit breakers has to accommodate only half the amperage. However, this has proven to be insufficiently operationally reliable in the case of switchover. Due to structural tolerances, it is practically unavoidable that one of the two circuit breakers switches faster than the other; thus, in the interim, the entire current flows via only a single circuit breaker. This circuit breaker thereby becomes overloaded. This problem has a particularly unfavorable effect in the case of a short circuit, if the highest current load occurs. As a result, this means that precisely in the situation when the circuit breakers are needed (for example, in a short circuit), there is a high probability that they will fail due to overloading. This is unsatisfactory.

SUMMARY OF THE INVENTION

According to some embodiments, an improved switching arrangement is provided for the circuit breakers in order to avoid the aforementioned disadvantage.

According to some embodiments, a wind turbine includes a wind rotor including a generator and a converter for generating electric power which is delivered to the grid via a feed line and a turbine transformer. According to some embodiments, the feed line is configured as a double branch including a power-branched power circuit breaker unit having a first feed line and a second feed line connected in parallel, wherein a separate low-voltage winding of the turbine transformer and a separate power circuit breaker for the converter are associated with each feed line.

A power circuit breaker is to be understood to be an electromechanical operating means for connecting the converter, said means being power-operated and performing a circuit-breaking function in that it also brings about a disconnection in the case of overload current. For this purpose, the power circuit breaker is designed in such a way that it can accommodate short-circuit currents. Multiple power circuit breakers may be combined into a power circuit breaker unit.

According to some embodiments, a separate low-voltage winding of the turbine transformer is associated with a separate feed line to each power circuit breaker. As a result, the respective power circuit breaker has to accommodate only the current of this one low-voltage winding, namely at any point in time. This thus also holds true if one of the two power circuit breakers switches faster than the other during switchover; in this case as well, the power circuit breaker switching more slowly does not have to accommodate the entire current, but rather just a fraction. In other words, thanks to aspects of the present invention, each branch of the feed line switches individually, so to speak; no power circuit breaker has to carry the entire current, not even for a brief period. Thus, it is achieved in a surprisingly simple manner that the current which is generated by the wind turbine and which is to be fed in, is distributed to multiple power circuit breakers in a stable manner, in such a way that even during switchover, no dynamic overloading is able to occur with respect to the maximum current-carrying capacity.

Advantageously, additional feed lines may be provided with a separate shunt winding and a separate power circuit breaker. Thus, three or more feed lines are preferably provided.

Preferably, the low-voltage windings of the first or second feed line (or additional feed lines) act on a common medium-voltage winding of the turbine transformer. Thus, a multiple-winding transformer is provided in which multiple low-voltage windings act on a common medium-voltage winding. This enables a compact and cost-saving configuration. Nonetheless, the self-sufficiency of the individual feed lines underlying the present invention, in which exactly one low-voltage winding of the transformer is associated with each power circuit breaker, is fully maintained.

Alternatively, however, it may also be provided that separate turbine transformers are provided for the feed lines, so that each feed line has its own transformer. Although this is more complex, it may provide the advantage of higher redundancy. Furthermore, this has the particularly significant advantage within the scope of the present invention that an increase in impedance of the transformers thus results, so that the short-circuit current in the respective feed line is decreased. Thus, additional relief is provided to the power circuit breakers.

It is particularly preferred if there is no cross-connection between the first and the second feed lines (and possibly additional feed lines). It is thus achieved that even in the case, for example, of a defective power circuit breaker, no current is able to flow out of the one feed line through the power circuit breaker of the other feed line. The desired overload protection is thus increased.

Furthermore, it may advantageously be provided that two (or more) converters are provided, to which the two (or more) feed lines are connected. Since a separate converter may thus be associated with each feed line, the described effect also holds true with respect to the converter. Thus, even in normal operation, in the case of a malfunction of a power circuit, it cannot occur that the adjacent power circuit breaker would have to accommodate correspondingly more current, and would thereby be overloaded. Thus, the reliability is further increased.

Advantageously, the transformers associated with the feed lines are sized equally, wherein sizing deviations are allowable up to a maximum deviation of 20%, preferably a maximum of 10%. By means of this equal sizing, it is achieved that in the normal case, the feed lines are all equally loaded. It is thus avoided that certain power circuit breakers are loaded with larger currents than another of the power circuit breakers, so that the wear of the power circuit breakers, which is unavoidable per se, is also evened out. Thus, not only is the fail-safety improved, but also the operational reliability of the wind turbines overall.

It should be noted that separate fuses are often arranged at the transformer. They are used only for protecting the feed line in the case of short circuits. Thus, they are not power circuit breakers in the context of the present invention.

BRIEF DESCRIPTION OF THE DRAWINGS

The present invention will be described in greater detail below with reference to the appended drawings, in which one advantageous exemplary embodiment is depicted. The following are shown.

DETAILED DESCRIPTION OF THE INVENTION

Figure 1:
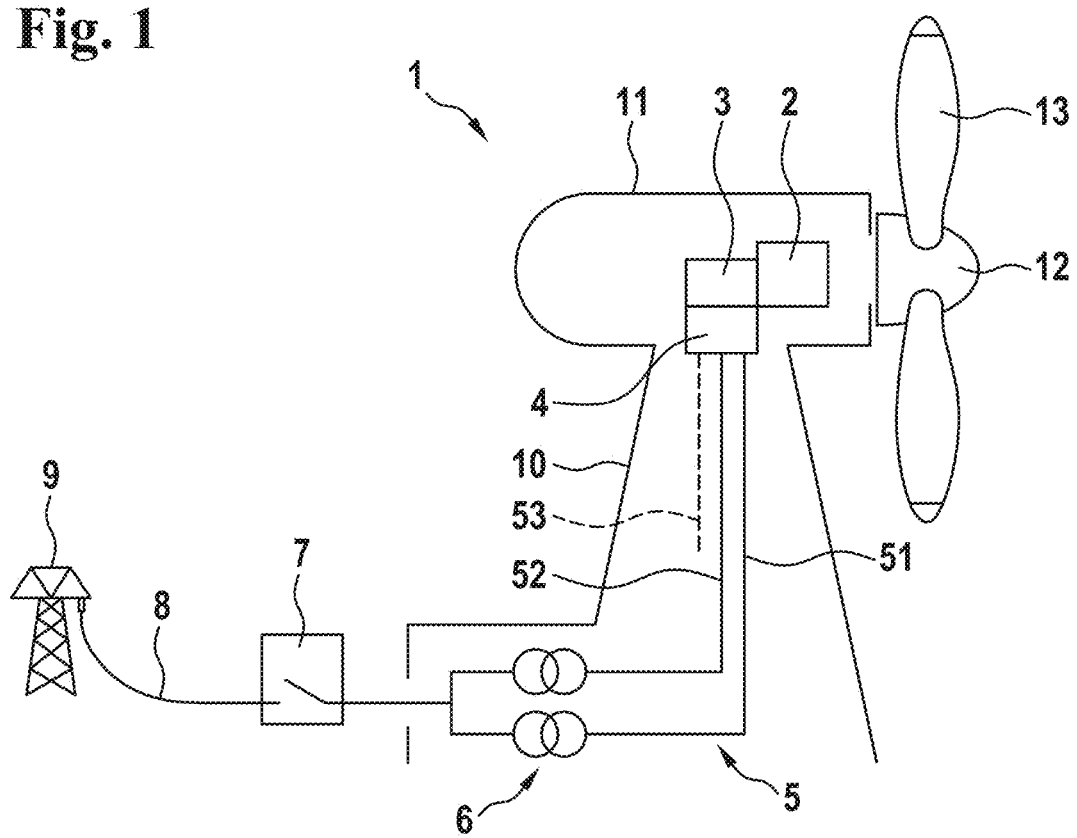
FIG. 1: a schematic view of a wind turbine according to a first exemplary embodiment of the present invention.

A wind turbine according to one exemplary embodiment of the present invention, which is referred to in its entirety by the reference numeral 1, comprises a nacelle 11 which is pivotably arranged on the upper end of a tower, on the front side of which a wind rotor 12 having multiple rotor blades 13 is rotatably arranged. Via a rotor shaft (not depicted), the wind rotor 12 drives a generator 2 which converts the mechanical power supplied by the wind rotor 12 into electric power and outputs it via a converter 3. At the output of the converter 3, a power circuit breaker unit 4 is arranged which, in the depicted exemplary embodiment, comprises a first power circuit breaker 41 and a second power circuit breaker 42. From there, the electric power is supplied at a low-voltage level via feed lines 5 to a turbine transformer 6. The turbine transformer 6 is designed to raise the electric power supplied at the low-voltage level to a medium-voltage level and to output it via a medium-voltage line 8 to a grid 9. The grid 9 may be a power transmission grid or a local grid, for example the farm grid of a wind farm.

For the feed line, an arrangement is provided in the depicted exemplary embodiment which is made up of two parallel feed lines: a first feed line 51, and a second feed line 52. Hereinafter, the configuration of the feed line, which is designed identically per se, is to be described using the example of the feed line 51. One end of the feed line 51 is connected to the converter 3; more precisely, to a first power circuit breaker 41 arranged at the output of the converter 3. It is assumed that the converter 3 is arranged in the nacelle 11 of the wind turbine, and that the turbine transformer 6 is arranged at the base of the tower 10 of the wind turbine 1. The feed line 51 thus runs from the power circuit breaker unit 4 at the converter 3, through the tower 10, to a low-voltage winding 61 of the turbine transformer 6 which is arranged at the tower base. In addition to this first low-voltage winding 61, the turbine transformer 6 also comprises at least a second low-voltage winding 62, both acting jointly upon a medium-voltage winding 60 to which the grid 9 is connected. The second feed line 52 is correspondingly configured and comprises a second power circuit breaker 42 at the converter 3 which connects the second feed line 52 to the second low-voltage winding 62 of the turbine transformer 6. A cross-connection between the feed lines 51, 52 does not exist, in any case at the low-voltage level. A medium-voltage switch 7 is provided at the medium-voltage line 8 of the turbine transformer 6. Optionally, one (or multiple) additional feed line(s) 53 may be provided, which is (are) merely symbolically depicted and are correspondingly designed like the first and second feed lines 51, 52, and which has (have) a separate power circuit breaker (not depicted).

Figure 5:
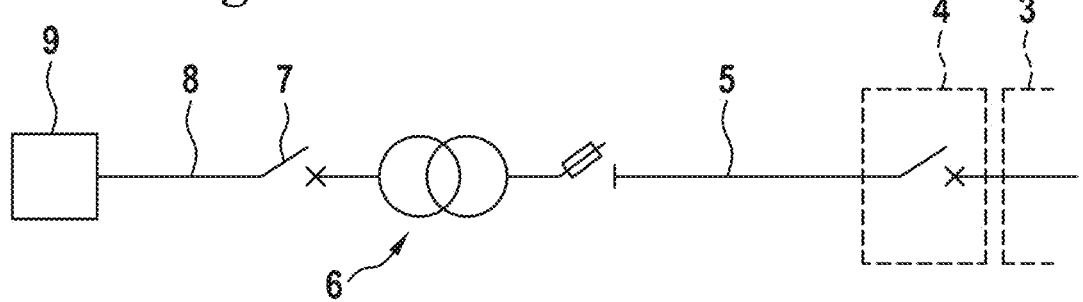
FIG. 5: a schematic diagram for a wind turbine according to the prior art.

In the prior art, the power transmission occurs according to the scheme depicted in FIG. 5. The converter 3 delivers the power via a feed line 5 to a turbine transformer 6 having a separate circuit breaker, said transformer in turn feeding said power into a grid 9 via a medium-voltage switch 7. A single power circuit breaker 4 is provided in the feed line 4 at the converter 3 for protecting and disconnecting the wind turbine 1, in particular in the case of a short circuit.

Figure 2:
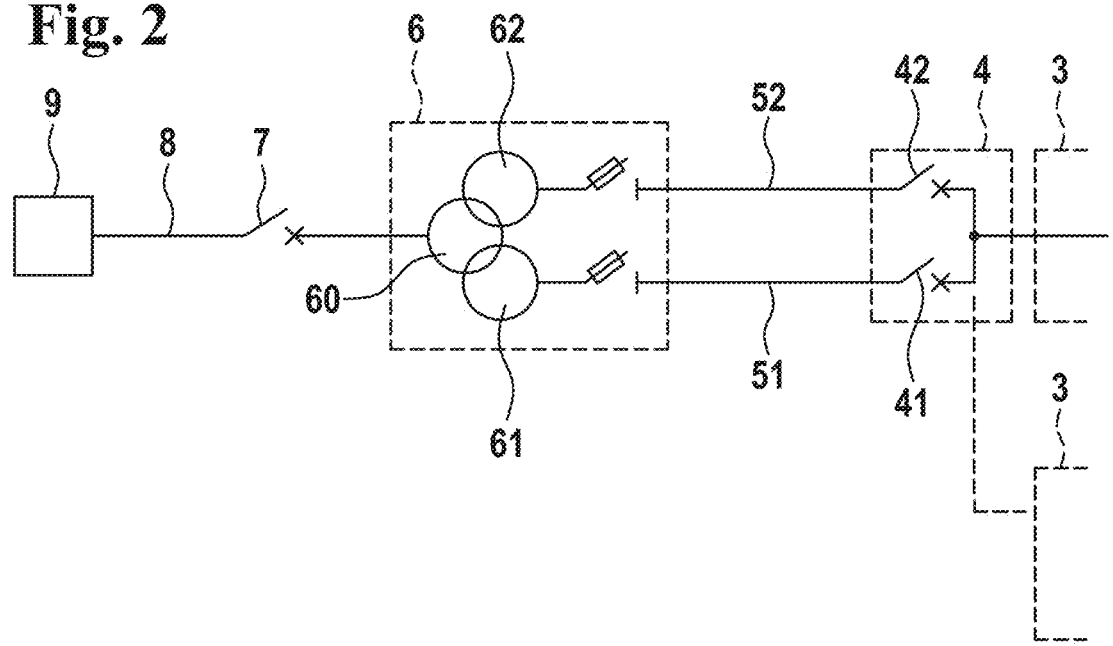
FIG. 2: a functional diagram for a first exemplary embodiment of the present invention.

Reference will now be made to the depiction in FIG. 2, which schematically depicts a first exemplary embodiment of the present invention. Clearly apparent is the parallel routing of the feed lines 51, 52 with the power circuit breakers 41, 42, via which the converter 3 is connected to the turbine transformer 6. Via the parallel circuit, approximately the same current flows in each of the two feed lines 51, 52, said current being only half as high as in a conventional design having only one feed line (see FIG. 5). Thus, in normal operation, the current load for the power circuit breakers 41, 42 is halved. Therefore, according to the present invention, if the current-carrying capacity of the power circuit breakers 41, 42 remains constant, a doubling of the rated currents, and thus a doubling of the rated power of the wind turbine, may be achieved, compared to a conventional design according to FIG. 5.

Figure 3:
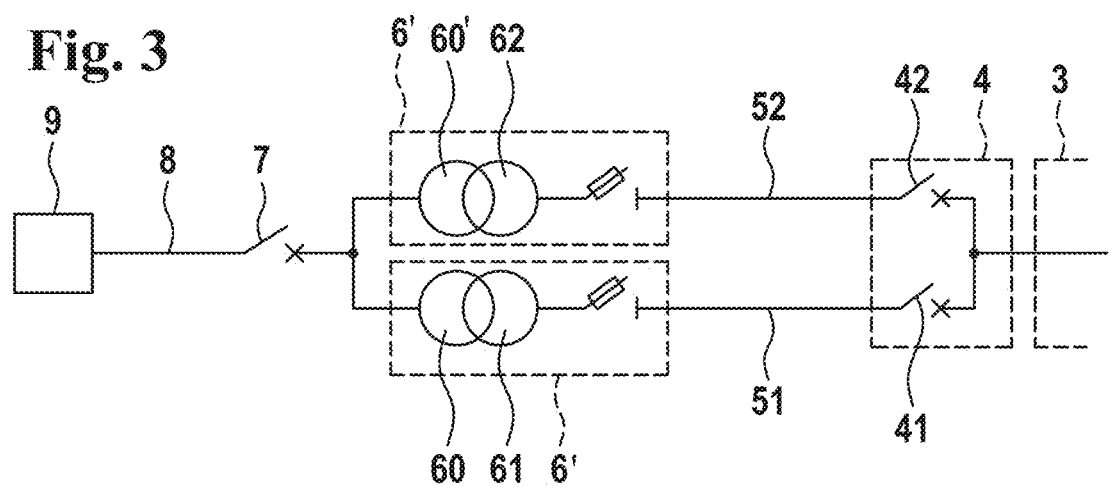
FIG. 3: a functional diagram for a second exemplary embodiment of the present invention.

An alternative embodiment is depicted in FIG. 3. It differs from the first embodiment depicted in FIG. 2 essentially due to a differently designed turbine transformer. It is no longer a multiple-winding transformer as in the first embodiment in FIG. 2, but rather two separate partial transformers 6'. They are both configured identically, and each has a low-voltage winding 61, 62 and a medium-voltage winding 60, 60'. The two medium-voltage windings 60, 60' are connected in parallel and act jointly on the medium-voltage switch 7 for delivering the electric power to the grid 9. On the low-voltage side, the configuration is identical to the embodiment depicted in FIG. 2. During normal operation, the same ratios result as in the embodiment depicted in FIG. 2; i.e., the current load in each branch 51, 52 of the feed line 4 is halved. By means of the design of the turbine transformer 6 as two small partial transformers 6', the rating of each of the two partial transformers 6' is halved. This means that not only the operating current, but also the short-circuit current, is halved in each of the two feed lines 51, 52. Thus, a corresponding reduction in the load of the power circuit breakers 41, 42 on the end of the feed lines 51, 52 results not only in the case of normal operation and the operating currents thus flowing, but also in the case of a short circuit having the larger short-circuit currents which thus flow. This embodiment thus provides improved protection of the power circuit breakers 41, 42.

Figure 4A:
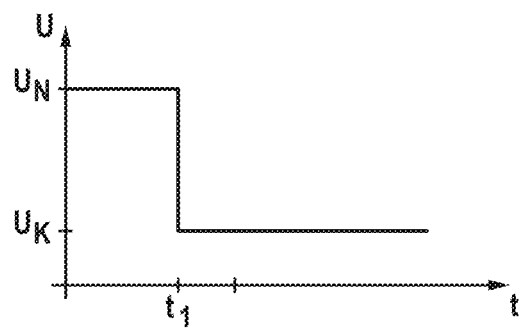
FIGS. 4a to 4c: diagrams depicting voltage and current curves and switch positions.
Figure 4B:
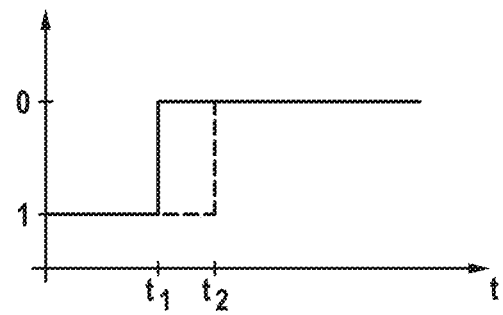
Figure 4C:
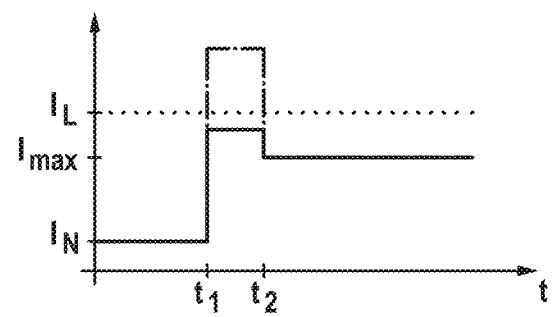

FIGS. 4a to 4c describe voltages and current-switching states, using the example of a short circuit. FIG. 4a depicts the voltage curve based on a rated voltage, in the case of a short circuit which occurs at time $t=t_1$. At time $t_1$, the voltage drops abruptly to a value $U_k$. At this point in time, the power circuit breakers 41, 42 are to disconnect. The desired curve, which, for example, is achieved by the power circuit breaker 41, is depicted in FIG. 4b by a solid line. It is assumed that due to unavoidable technical tolerances, the power circuit breaker 42 does not switch exactly simultaneously, but with a slight time delay at time $t_2$ (see depiction with dashed line). FIG. 4c depicts the resulting current curve, by way of example using the example of the power circuit breaker 42. At the start, i.e., up to time $t_1$, the current flow is quite low, in the range of the operating current IN. After the occurrence of the short circuit and the decay of transients after time $t_2$, the current flow has increased to a significantly higher value, i.e., the value for the short-circuit current $I_{max}$. In the time therebetween, i.e., during the switchover time, during which the first power circuit breaker 41 has already disconnected, but the second has not yet, the dashed curve results. As a result of the delayed switchover of the power circuit breaker 42, the entire current flows across it briefly, i.e., not just half, as intended per se. The overshoot, depicted by the dash-dotted line, thus results above the current limit value $I_I$ of the power circuit breaker 41, 42, depicted by the dotted horizontal line. This is the curve which would result in the case of a switching arrangement according to the prior art. By means of the circuit as implemented in particular in the embodiment according to FIG. 3, the harmful overcurrent (dash-dotted line) is avoided, and the current load of the power circuit breaker 42 follows the solid line and remains below the current limit value $I_{max}$.

The invention claimed is:

1. A wind turbine comprising,
   a wind rotor,
   a generator,
   a converter for receiving and converting a total electric power generated by the generator,
   a turbine transformer, and
   a feed that connects the converter to the turbine transformer;
   the wind turbine being configured for delivering generated electric power to a grid via the feed,
   wherein the feed is configured as a double branch comprising a power-branched power circuit breaker unit that has a first feed line and a second feed line connected in parallel,
   wherein the power-branched power circuit breaker unit comprises a respective separate power circuit breaker for connecting each of the first and second feed lines to the converter, and wherein the first and second feed lines are each connected to the grid with a separate low-voltage winding of the turbine transformer,
   wherein the total electric power generated by the generator is branched in the power circuit breaker unit into the first and the second feed lines via the respective power circuit breakers, and
   wherein no cross-connection exists between the first and the second feed lines so that no current is able to flow out of one of the feed lines and into the other one of the feed lines through the respective power circuit breaker of the other one of the feed lines.

2. The wind turbine of claim 1, wherein a third feed line is arranged in parallel with the first feed line and the second feed line.

3. The wind turbine of claim 1, wherein the respective separate low-voltage windings act on a common medium-voltage winding of the turbine transformer.

4. The wind turbine of claim 1, wherein each of the feed lines comprises a separate transformer having a separate medium-voltage winding.

5. The wind turbine of claim 1, wherein a separate converter of the wind turbine is provided for each feed line.

6. The wind turbine of claim 1, wherein the respective low-voltage windings for the feed lines are sized equally.

7. The wind turbine of claim 6, wherein a sizing deviation between the respective low-voltage windings transformers is less than 20%.

8. The wind turbine of claim 6, wherein a sizing deviation between the respective low-voltage windings is less than 10%.

* * * * *

UNITED STATES PATENT AND TRADEMARK OFFICE
CERTIFICATE OF CORRECTION

PATENT NO. : 10,637,248 B2
APPLICATION NO. : 15/928405
DATED : April 28, 2020
INVENTOR(S) : Heinz-Hermann Letas Page 1 of 1

It is certified that error appears in the above-identified patent and that said Letters Patent is hereby corrected as shown below:

In the Specification

At Column 5, Line number 37, please delete "$I_I$" and insert -- $I_L$ --, therefor.

In the Claims

At Column 5, In Claim 1: Line number 47, please delete "comprising," and insert -- comprising: --, therefor.

At Column 6, In Claim 7: Line number 43, after "windings" please delete "transformers".

Signed and Sealed this
Twenty-second Day of December, 2020

Andrei Iancu
*Director of the United States Patent and Trademark Office*